Nov. 15, 1949  W. A. BISHMAN  2,488,263
LUGGAGE CARRIER
Filed Nov. 16, 1945
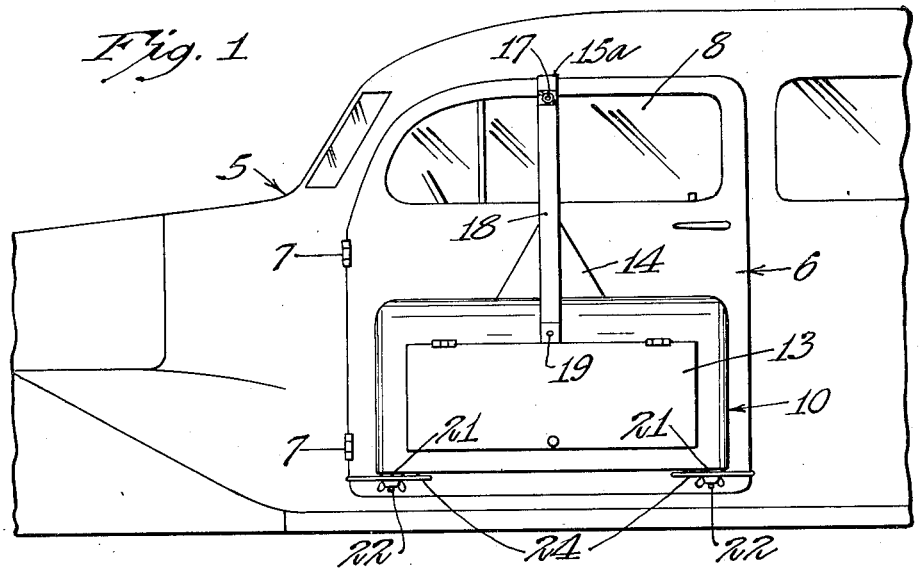
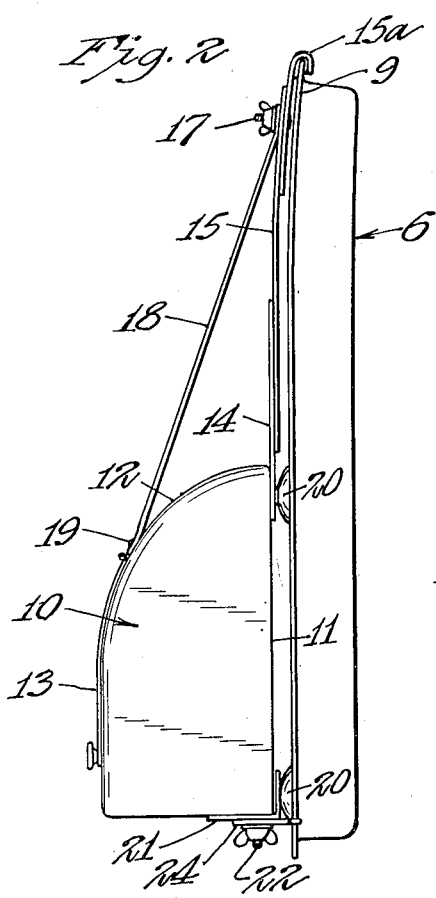
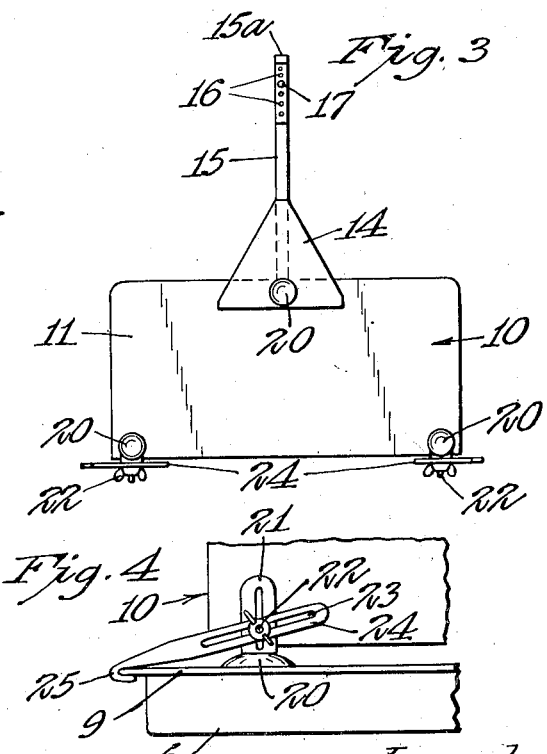
Inventor
Walter A. Bishman
By Williamson & Williamson
Attorneys Patented Nov. 15, 1949

2,488,263

UNITED STATES PATENT OFFICE 2,488,263

LUGGAGE CARRIER

Walter A. Bishman, Minneapolis, Minn.

Application November 16, 1945, Serial No. 629,040

3 Claims. (Cl. 224—42.44)

This invention relates to luggage carriers and is adapted for use on the outer side of a motor vehicle door.

It is a general object of the invention to provide a readily attachable and removable luggage carrier which can be quickly and easily connected to an automobile door and which is supported in a safe strong manner.

A more specific object of the invention is to provide a carrier which can be attached to and entirely supported by the automobile door so that it can be used with vehicles of the modern types which have very little or no runningboards.

A further object of the invention is to provide a carrier of the general type described wherein means is provided for securing it against shifting or swaying when the vehicle is in motion.

The above and other objects and advantages of the invention will more fully appear from the following description made in connection with the accompanying drawings, wherein like reference characters refer to the same parts throughout the views, and, in which:

Figure 1 is a fragmentary side elevation of an automotive vehicle with the carrier applied to a door;

Figure 2 is an end elevation of the device on a door;

Figure 3 is a rear elevation of the device per se and on a reduced scale; and

Figure 4 is an enlarged fragmentary bottom plan view of one of the lower connecting units.

In Figure 1 there is shown a vehicle 5 having the usual door 6 hung on hinges 7. As shown and as is customary the lower portion of the door panel is of metal and the upper portion is provided with a window 8.

As shown in Figure 2, and as is conventional in door constructions, said door 6 is provided with an outer edge flange 9 which extends entirely about the door.

The luggage carrier includes a receptacle or container 10 which may be formed of any suitable material and preferably is weather proof and relatively water tight. The receptacle 10, as shown, has a vertical rear wall 11 and its outer or front wall 12 is curved downwardly and outwardly to give the device a neat appearance yet it lies against the door of the vehicle. The outer wall 12 of the receptacle 10 is provided with a hinged door 13 to give access to the interior thereof and to contain articles therein.

Secured to the upper central portion of the rear wall 11 is a plate 14. Connected to and extending upwardly from the plate 14 is a longitudinally adjustable suspension element 15 in the form of a metal strip which is split and provided with apertures 16 to adjustably receive a nutted bolt 17 so that the length of the strip 15 can be varied. The upper end of the strip 15 is bent over as at 15a in the form of a hook which is adapted to fit over the vehicle door edge 9 and thereby support the receptacle 10.

A further means of suspension or support is provided by a strap 18 which is connected to the forward or outer portion of the receptacle 10 as at 19. The strap 18 extends upwardly and diagonally rearwardly and connects with the nutted bolt 17. Thus the vertical suspension of the receptacle 10 is in a perpendicular direction in the rear and a diagonally bracing direction by means of the strap 18.

Connected to the rear of the receptacle 10 at three points as shown in Figure 3 are suction cups 20 which are directed inwardly toward the door panel and adapted to engage the door panel to prevent the carrier from swinging outwardly when the car is in motion. The suction cups 20 are not intended to support any weight since the weight bearing structure is the straps 15 and 18.

Connected to the rear lower portion of the receptacle 10 at each end thereof is a bracket 21 having a nutted bolt 22 extending therefrom and which extends through a slot 23 in an adjustable retaining member 24. The member 24 has an outer hooked end 25 which is adapted to engage the door edge 9 at the lower side portions of the door as shown in the drawing. The member 24 is adjustable to accommodate different widths of vehicle doors.

It is common in automobile construction to mount the doors with some space between the edges 9 and the frame of the vehicle. Consequently, if the hooks 15a and 25 are made of a strong thin metal they can readily be placed, as shown and described, without interfering with the closing of the vehicle door.

It will be seen that I have provided a readily attachable and removable luggage carrier which can be mounted on the door of a vehicle in a secure manner. Whether or not the vehicle has a running board to which the carrier might be secured, it will be seen that by mounting it on the door itself occupants of the vehicle can readily open and close the door to get in and out of the vehicle. This is generally not true of a carrier which is connected to the running board, and, as stated above, modern vehicles have little or no running board exposed and therefore could not have a luggage carrier attached to it.

The structure of the door is such that the carrier can be readily suspended as disclosed, the flange or edge 9 of the door 6 being of considerable strength. As stated above, I have provided means for preventing the carrier from shifting longitudinally or laterally.

It will, of course, be understood that various changes may be made in the form, details, arrangement and proportions of the various parts without departing from the scope of my invention.

What I claim is:

1. A luggage carrier for motor vehicles including, a receptacle, a suspension element connected to said receptacle and having an open portion arranged to engage the upper edge of a vehicle door with said receptacle on the outer side of said door, and attachment means on said receptacle for engaging the lower side edge portions of a vehicle door to prevent shifting of the receptacle relative to the door.

2. A luggage carrier for motor vehicles including, a receptacle, a suspension element connected to said receptacle and extending upwardly therefrom, said suspension element being arranged to support said receptacle on the outer side of a vehicle door, an upper portion of said suspension element being shaped to grip the upper edge of the vehicle door, and an attachment device on said receptacle and releasably securable to the lower side edge portions of the vehicle door to retain said receptacle against swinging movement relative to said door.

3. A luggage carrier for motor vehicles including, a receptacle, a suspension element connected to said receptacle, and extending upwardly therefrom, said suspension element being arranged to support said receptacle on the outer side of a vehicle door, an upper portion of said suspension element being shaped to lie over the upper edge of the vehicle door, and attachment means on said receptacle including a suction cup mounted upon the rear of and facing inwardly from the receptacle to engage the outer face of a vehicle door panel, and hooks extending horizontally from the rear portion of said receptacle and adapted to engage the lower side edge portions of a vehicle door.

WALTER A. BISHMAN.

REFERENCES CITED

The following references are of record in the file of this patent:

UNITED STATES PATENTS

| Number | Name | Date |
|---|---|---|
| 1,412,700 | Moon | Apr. 11, 1922 |
| 1,778,771 | Pritchard | Oct. 21, 1930 |
| 1,919,271 | Cady | July 25, 1933 |
| 2,119,072 | Cohen | May 31, 1938 |
| 2,302,300 | Davies | Nov. 17, 1942 |

FOREIGN PATENTS

| Number | Country | Date |
|---|---|---|
| 852,539 | France | Oct. 30, 1939 |